Nov. 26, 1957 R. H. EDWARDS 2,814,780
BRIDGE-TYPE MODULATOR MIXER
Filed July 20, 1953
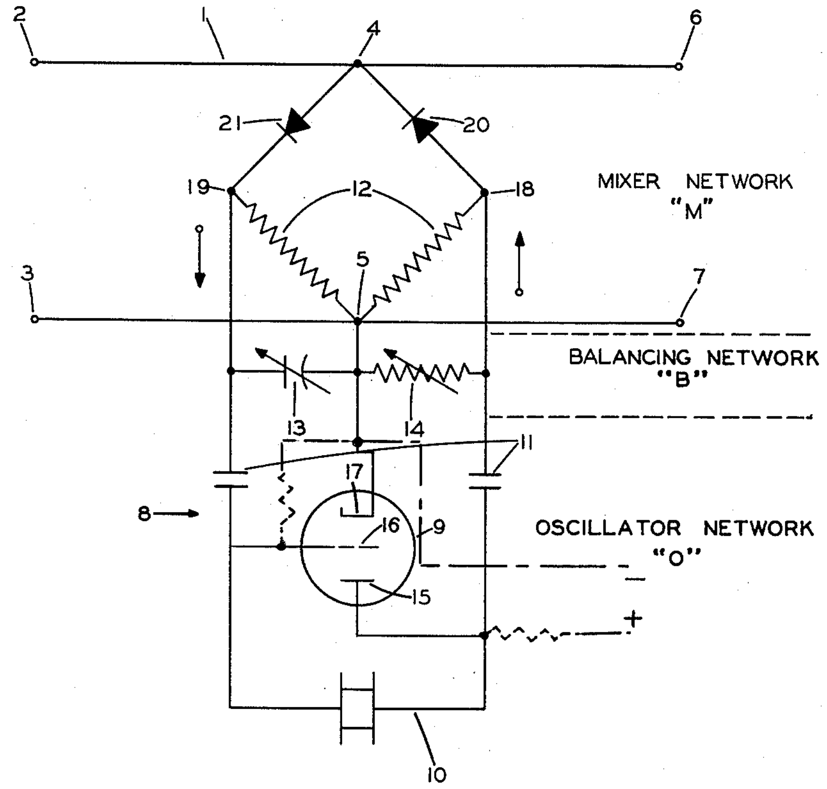
INVENTOR.
RICHARD H. EDWARDS
BY
F. D. Copeland Jr.
AGENT

United States Patent Office 2,814,780

Patented Nov. 26, 1957

2,814,780

BRIDGE-TYPE MODULATOR MIXER

Richard H. Edwards, Garland, Tex., assignor to Engineering Laboratories, Inc., Garland, Tex., a corporation of Delaware Application July 20, 1953, Serial No. 369,043

2 Claims. (Cl. 332—43)

This invention relates generally to an electronic circuit for delivering output frequencies by combining a carrier frequency and an oscillator frequency and has for its primary object to provide such a circuit in which the mentioned frequencies are combined without the use of transformers.

Another object of this invention is to provide an economical and yet very effective means for producing multiple frequencies.

In a superheterodyne receiving system it is necessary to employ a balanced type converter where the local oscillator frequency is near the intermediate frequency and the I. F. amplifier has a rather wide bandpass. The balanced converter prevents oscillator voltage from appearing at the output terminals. Circuits heretofore employed for this purpose have required the use of precision wound transformers which are quite expensive.

Other objects and advantages of the invention will become apparent from the following description, and for the purposes of illustration, but not of limitation, embodiments of the invention are shown in the accompanying drawings in which the figure is a circuit diagram of an elementary circuit including the improved frequency converter of this invention.

Referring now more particularly to the characters of reference on the drawing, the signal circuit 1 is seen to include input terminals 2, 3, junction points 4, 5 and output terminals 6, 7. The complete branch circuit 8 joins the signal circuit 1 at junctions 4, 5. This branch circuit is comprised of a vacuum tube 9, crystal 10, capacitors 11, resistors 12, which together with balancing capacitor 13 and balancing resistor 14 form an oscillating circuit balanced with respect to point 5; diodes 20 and 21 in circuit between points 18—4 and 4—19 respectively complete the components of the branch circuit 8. Vacuum tube 9, in this instance, includes plate 15, grid 16 and cathode 17. Tube 9 has the usual filament supply, D. C. plate supply, and D. C. grid bias shown in phantom in the drawing.

The branch circuit 8, for purposes of description may be visualized as consisting of a mixer network M, a balancing network B, and an oscillator network O.

In operation, vacuum tube 9 oscillates at a frequency *fo* determined by crystal 10. Oscillating currents having this frequency *fo* flow alternately between plate 15 through the circuit including capacitors 11 and resistors 12; consequently the voltages at points 18 and 19 are always opposite in phase with reference to their intermediate point 5. Resistors 12 are of equal value and in one embodiment a value of 100 ohms produced a voltage across each resistor of 5 R. M. S. Diodes 20 and 21 are identical and form a parallel circuit between points 18 and 19. Therefore current flows through diodes 20 and 21 (in the direction of the arrowhead which is part of the symbol 20, 21) during the half cycle of oscillation of tube 9 when point 18 is positive with respect to point 19. If the circuit were perfectly balanced, there would be no difference in potential between junction points 4 and 5 at the frequency of the oscillator. Since this condition is extremely unlikely due to tolerances in the manufactured units, variable capacitor 13 and variable resistor 14 are included as fine balancing adjustments. Units 13 and 14 are adjusted to obtain a minimum voltage at the oscillator frequency *fo* between junction points 4 and 5.

To obtain frequency conversion, a signal of frequency *fc* is applied to terminals 2 and 3 and also appears at junction points 4 and 5. During one half-cycle of the signal voltage, a current flows from point 4 through diode 21, through one resistor 12 to point 5; during the other half-cycle, a current flows from point 5 through the other resistor 12 and through diode 20 to junction point 4. The fact that both a signal frequency current and an oscillator frequency current flow through elements 20 and 21 results in a mixing action and voltages are developed between points 4 and 5 at frequencies which are the sum and difference of signal frequency *fc* and oscillator frequency *fo*. Since all three frequencies *fc*, *fc*+*fo*, and *fc*—*fo*, appear between input terminals 2 and 3 as well as between output terminals 6 and 7, it may be necessary to use frequency selective circuits (not shown) in any external circuit with which this frequency converter circuit is employed.

One advantage of this circuit is that no voltage at the oscillator frequency *fo* appears at the output of this converter. This voltage would be very undesirable, since it is of such high intensity compared to the usual signal voltage.

The input and output impedance of this circuit at their respective frequencies and using the resistance values called out has been found to be in the neighborhood of 1000 ohms. Impedance matching networks may therefore be required for coupling to the external input and output equipment.

In practice, it has been found that under certain conditions it is necessary to transpose the positions of variable capacitor 13 and variable resistor 14 to obtain the right combination to produce a null in the oscillator frequency voltage across output points 6 and 7. It may also be convenient to replace crystal 10 with a tuned LC circuit for economy of manufacture or when a crystal is unavailable.

The specific values for one circuit used in practice were as follows: resistors 12, 100 ohms; capacitors 11, 50 mmf.; diodes 20, 21, IN70; variable capacitor 13, 5–50 mmf.; resistor 14, 1 kilohm variable, tube 9, ½12AV7; and crystal 10, 2 mc. frequency. These values were satisfactory when used with an input frequency at terminals 2, 3, of 380 kc. to provide a converted output at terminals 6, 7 of 2,380 kc. and 1,620 kc.

From the foregoing description it will be readily seen that there has been produced a device as substantially fulfills the objects of the invention as set forth herein.

While this specification sets forth in detail the present and preferred construction of this invention, still in practice such deviations from such detail may be resorted to as do not form a departure from the spirit of the invention as defined in the appended claims.

Having thus described the invention, what is claimed as new and useful and is desired to be secured by Letters Patent is:

1. A frequency converter for a circuit having an initial frequency comprising: a branch circuit, including an oscillator network comprising a tuned circuit and an oscillating tube, a mixer net work, and a balancing network, connected to said circuit at junction points of opposite polarity; said mixer network comprising a bridge connected to said circuit at said junction points, resistances in two legs of said bridge, diodes in said other legs of said bridge, additional points on said bridge between said resistance legs and said diode legs, a cathode in said oscillator tube connected to the junction point of said bridge between said resistances and simultaneously to said initial frequency circuit, said oscillator network connected in circuit with said additional points whereby the output frequency of said oscillator network is combined with said initial frequency to provide an output frequency which is the sum of said initial and oscillator frequencies at said junction points.

2. A frequency converter for a two-wire circuit having an initial input frequency, comprising: a branch circuit connecting said two-wire circuit at one junction point on each wire: said branch circuit comprising: an oscillator network, a balancing network, and a mixer bridge network; said oscillator network including a crystal having the desired oscillator frequency, a vacuum tube including a plate, grid, and cathode, an oscillating circuit including said plate and cathode connected to one leg of said bridge and including said grid and cathode connected to an adjacent leg of said bridge, circuit connections between said crystal and each leg circuit, a capacitor in each crystal-leg circuit to form a complete circuit for continuous oscillation at said crystal frequency; said balancing network including a variable capacitor inserted between said crystal-grid circuit and said cathode circuit, and a variable resistor inserted between said crystal-plate circuit and said cathode circuit; said mixer network comprising a pair of fixed resistors and a pair of unidirectional diodes; circuit connections between said branch circuit and said two-wire circuit to provide output frequencies which comprise only the initial frequency, the sum of said initial and oscillator frequencies, and the difference of said initial and oscillator frequencies.

References Cited in the file of this patent

UNITED STATES PATENTS

| | | |
|---|---|---|
| 1,959,459 | Cowan | May 22, 1934 |
| 2,078,974 | Riesz | May 4, 1937 |
| 2,373,569 | Kannenberg | Apr. 10, 1945 |
| 2,492,863 | Hays | Dec. 27, 1949 |
| 2,613,320 | Panetta | Oct. 7, 1952 |
| 2,724,777 | Brock | Nov. 22, 1955 |

OTHER REFERENCES

Grass et al.: Abstract of appl. Serial No. 596,725, published Jan. 24, 1950, O. G.